(12) United States Patent
Hawkins et al.

(10) Patent No.: US 9,180,791 B2
(45) Date of Patent: Nov. 10, 2015

(54) SEAT-BACK WITH ANCHORAGE BAR

(75) Inventors: Stephen Hawkins, Ypsilanti, MI (US);
Steven Schenten, Oxford, MI (US)

(73) Assignee: Salflex Polymers Limited, Weston, ON (CA)

( * ) Notice: Subject to any disclaimer, the term of this patent is extended or adjusted under 35 U.S.C. 154(b) by 38 days.

(21) Appl. No.: 13/990,548

(22) PCT Filed: Dec. 1, 2011

(86) PCT No.: PCT/US2011/062903
§ 371 (c)(1),
(2), (4) Date: Aug. 12, 2013

(87) PCT Pub. No.: WO2012/075297
PCT Pub. Date: Jun. 7, 2012

(65) Prior Publication Data
US 2013/0313850 A1    Nov. 28, 2013

Related U.S. Application Data

(60) Provisional application No. 61/418,777, filed on Dec. 1, 2010.

(51) Int. Cl.
| | | |
|---|---|---|
| B60N 2/02 | (2006.01) | |
| B60N 2/015 | (2006.01) | |
| B60N 2/28 | (2006.01) | |
| B60N 2/68 | (2006.01) | |
| B60N 2/20 | (2006.01) | |

(52) U.S. Cl.
CPC *B60N 2/015* (2013.01); *B60N 2/20* (2013.01); *B60N 2/2893* (2013.01); *B60N 2/686* (2013.01); *B60N 2205/35* (2013.01)

(58) Field of Classification Search
CPC .... B60N 2/286; B60N 2/2809; B60N 2/2806; B60N 2/686; B60N 2205/35; B60N 2/2887; B60N 2/2893; B60N 2/2821
USPC ......... 296/65.16, 63, 64, 65.01, 65.03, 65.05, 296/65.09, 68.1; 297/253, 256.16
See application file for complete search history.

(56) References Cited

U.S. PATENT DOCUMENTS

| | | | |
|---|---|---|---|
| 4,218,074 A * | 8/1980 | Crawford | .................. 280/801.1 |
| 5,700,054 A * | 12/1997 | Lang | ............................. 297/238 |
| 5,713,634 A | 2/1998 | Koike | |

(Continued)

FOREIGN PATENT DOCUMENTS

| | | |
|---|---|---|
| DE | 19728052 A1 | 1/1999 |
| DE | 10 2009 050 840 A1 | 6/2011 |

(Continued)

OTHER PUBLICATIONS

US 8,905,485, 12/2014, Mitsuhashi et al. (withdrawn).*

(Continued)

*Primary Examiner* — Kiran B Patel
(74) *Attorney, Agent, or Firm* — Medler Ferro PLLC

(57) ABSTRACT

An automotive seat-back assembly is provided, having a seat-back panel, a plurality of floor-mount brackets for attaching the seat-back panel to an automotive floor, and an anchorage bar operably located on the seat-back panel. Provided on the anchorage bar is at least one anchorage fixture for engaging with a mating anchorage device provided on an object to be secured.

12 Claims, 5 Drawing Sheets

(56) References Cited

U.S. PATENT DOCUMENTS

| | | | | |
|---|---|---|---|---|
| 5,716,100 | A | * | 2/1998 | Lang ............... 297/378.12 |
| 5,904,404 | A | * | 5/1999 | McCulloch et al. ..... 297/378.12 |
| 5,918,934 | A | * | 7/1999 | Siegrist ............... 297/250.1 |
| 6,030,046 | A | * | 2/2000 | Dorow ............... 297/464 |
| 6,082,818 | A | * | 7/2000 | Muller ............... 297/250.1 |
| 6,491,346 | B1 | * | 12/2002 | Gupta et al. ............... 297/452.65 |
| 6,679,558 | B2 | | 1/2004 | Adams et al. |
| 6,688,700 | B2 | | 2/2004 | Gupta et al. |
| 6,739,673 | B2 | | 5/2004 | Gupta et al. |
| 6,802,124 | B2 | | 10/2004 | Kinzer et al. |
| 6,997,515 | B2 | | 2/2006 | Gupta et al. |
| 7,128,373 | B2 | * | 10/2006 | Kurtycz et al. ........... 297/452.15 |
| 7,137,670 | B2 | | 11/2006 | Gupta et al. |
| 7,168,738 | B2 | | 1/2007 | Garcia, Jr. et al. |
| 7,234,763 | B2 | | 6/2007 | Gupta et al. |
| 7,243,998 | B2 | | 7/2007 | Fourrey et al. |
| 7,250,091 | B2 | | 7/2007 | Gupta et al. |
| 7,300,102 | B2 | | 11/2007 | Gupta et al. |
| 7,377,586 | B2 | | 5/2008 | Evans |
| 7,954,899 | B2 | | 6/2011 | Chen et al. |
| 7,959,233 | B2 | | 6/2011 | Sweers et al. |
| 8,020,932 | B2 | * | 9/2011 | Yamada et al. ............... 297/257 |
| 8,157,322 | B2 | | 4/2012 | Daisuke et al. |
| 8,905,475 | B2 | * | 12/2014 | Schenten et al. ............... 297/232 |
| 2003/0062759 | A1 | * | 4/2003 | Gupta et al. ............... 297/452.65 |
| 2008/0018161 | A1 | * | 1/2008 | Evans ............... 297/440.14 |
| 2008/0277976 | A1 | * | 11/2008 | Austin ............... 297/2 |
| 2010/0109415 | A1 | * | 5/2010 | Roszczenko et al. ..... 297/452.18 |
| 2010/0156162 | A1 | * | 6/2010 | Sweers et al. ............... 297/452.2 |
| 2010/0156163 | A1 | | 6/2010 | Daisuke et al. |
| 2010/0283309 | A1 | * | 11/2010 | Funk et al. ............... 297/452.48 |
| 2010/0316823 | A1 | | 12/2010 | Jones et al. |
| 2011/0101744 | A1 | | 5/2011 | Naughton et al. |
| 2011/0285161 | A1 | | 11/2011 | Sweers et al. |
| 2011/0316320 | A1 | | 12/2011 | Kulkarni et al. |
| 2012/0261956 | A1 | | 10/2012 | Nasshan et al. |
| 2012/0319449 | A1 | * | 12/2012 | Schenten et al. ......... 297/452.18 |
| 2013/0140860 | A1 | * | 6/2013 | Naughton et al. ....... 297/216.13 |
| 2013/0341990 | A1 | * | 12/2013 | Muck et al. ............. 297/452.18 |
| 2014/0099454 | A1 | * | 4/2014 | Roychoudhury et al. ... 428/34.1 |

FOREIGN PATENT DOCUMENTS

| | | |
|---|---|---|
| FR | 2 822 766 | 10/2002 |
| FR | 2 930 476 | 10/2009 |
| JP | H03 47728 | 2/1991 |
| WO | 01/92051 | 12/2001 |
| WO | 2004/028858 | 4/2004 |

OTHER PUBLICATIONS

International Search Report and Written Opinion, Int'l Application No. PCT/US2011/062903, dated Apr. 4, 2012.
EP Search Report, EP Appl. No. 11 845 825.6, Jul. 14, 2014.

* cited by examiner

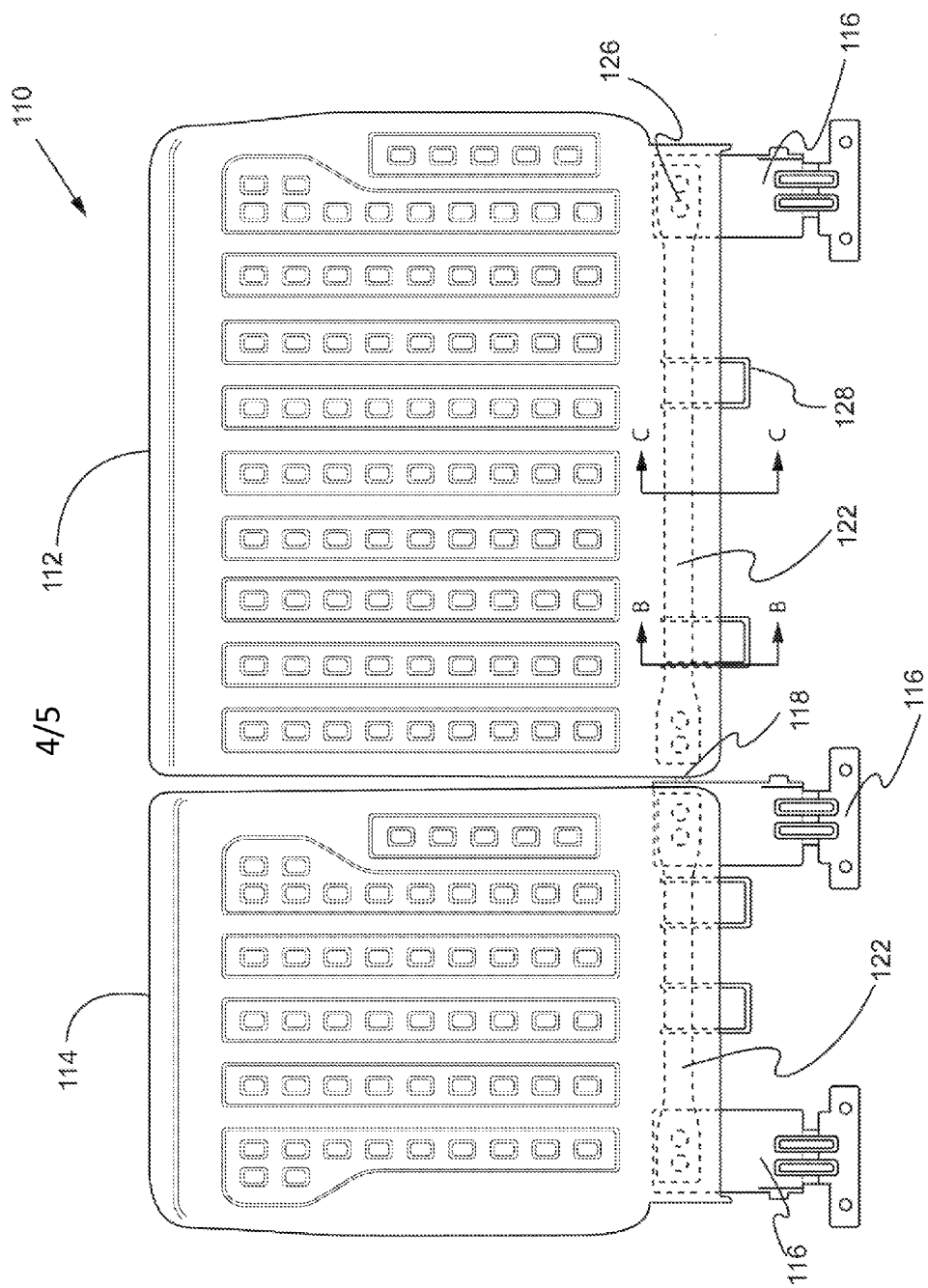

SEAT-BACK WITH ANCHORAGE BAR

CROSS-REFERENCE TO RELATED APPLICATIONS

This application claims benefit under 35 U.S.C. §119(e) to U.S. Provisional Patent Application No. 61/418,777, filed Dec. 1, 2010, entitled "SEATING SYSTEM," which is incorporated by reference herein in its entirety.

FIELD OF THE INVENTION

The present invention relates to an improved seating system of a passenger vehicle that includes a seat back assembly with a lower anchor attachment system for child restraint seats.

BACKGROUND OF THE INVENTION

For many years, prior art child restraint seats were fixed directly to the vehicle seat, generally by making use of the existing vehicle seatbelt system. In turn, a child was then securely restrained using a dedicated seatbelt system provided with the child restraint seat. In many instances, the overall installation of the child restraint seat in a vehicle was deficient in some capacity, oftentimes as a result of a complicated and difficult attachment arrangement.

More recently, an international standardized anchorage system has been developed, generally termed ISOFIX. ISOFIX defines standard attachment points to be manufactured into cars, enabling compliant child restraint seats to be securely installed. Child restraint seats are secured with a single tether attachment at the top, and two attachments at the base of each side of the seat.

The two attachment points at the base of each side of the seat are provided in the form of anchorage loops, and generally extend from the vehicle chassis. For example, the anchorage loops may be attached directly to the vehicle floor. The anchorage loops are configured to extend upwards, and are accessible at the juncture between the seat back, and the seat cushion. In general, structures to provide the ISOFIX attachment points are separate from the seat panels.

There has also been a current trend in automotive manufacturing to form automotive components using thermoplastics, generally for overall weight reduction. Seating systems and seatbacks in particular are required to meet certain loading characteristics, for example to reduce the risk of cargo intrusion during an accident event. To achieve the required load characteristics in plastic seat panels, and in particular with blow molded seat panels, additional stiffening structures such as steel reinforcement components are incorporated into the seat panel construction.

The incorporation of ISOFIX compliant structures into automotive vehicles and the ongoing development of plastic seat panels have up to now been separate engineering tasks. There is clearly a need for an improved ISOFIX compliant seat system that accommodates the shift towards light-weight materials in vehicle seat construction.

SUMMARY OF THE INVENTION

According to an aspect of an embodiment, provided is an automotive seat-back assembly having a seat-back panel, a plurality of floor-mount brackets for attaching the seat-back panel to an automotive floor, and an anchorage bar operably located on the seat-back panel. Provided on the anchorage bar is at least one anchorage fixture for engaging with a mating anchorage device provided on an object to be secured.

BRIEF DESCRIPTION OF THE DRAWINGS

The foregoing and other features and advantages of the invention will be apparent from the following description of the invention as illustrated in the accompanying drawings. The accompanying drawings, which are incorporated herein and form a part of the specification, further serve to explain the principles of the invention and to enable a person skilled in the pertinent art to make and use the invention. The drawings are not to scale.

FIG. 5 is a front view of a seat-back assembly according to another embodiment of the invention.

DETAILED DESCRIPTION OF EMBODIMENTS OF THE PRESENT INVENTION

Specific embodiments of the present invention will now be described with reference to the Figures, wherein like reference numbers indicate identical or functionally similar elements. The following detailed description is merely exemplary in nature and is not intended to limit the invention or the application and uses of the invention. A person skilled in the relevant art will recognize that other configurations and arrangements can be used without departing from the scope of the invention. Although the description and drawings of the embodiments hereof exemplify the technology with respect to automotive seatbacks, the invention may also be used in other seatback applications in non-automotive fields. Furthermore, there is no intention to be bound by any expressed or implied theory presented in the preceding technical field, background, brief summary or the following detailed description.

Figure 1:
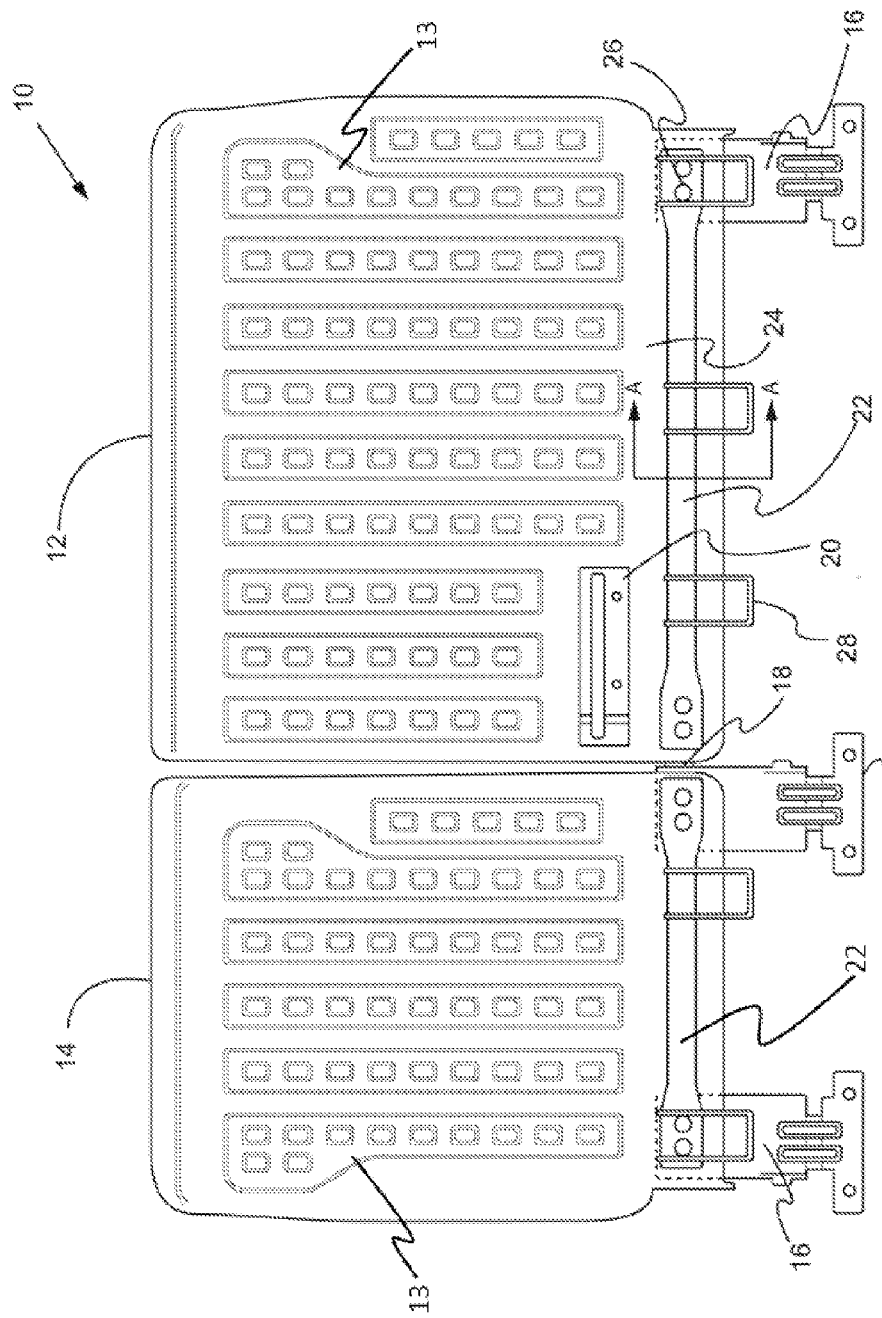
FIG. 1 is a front view of a seat-back assembly according to an embodiment of the invention.
Figure 2:
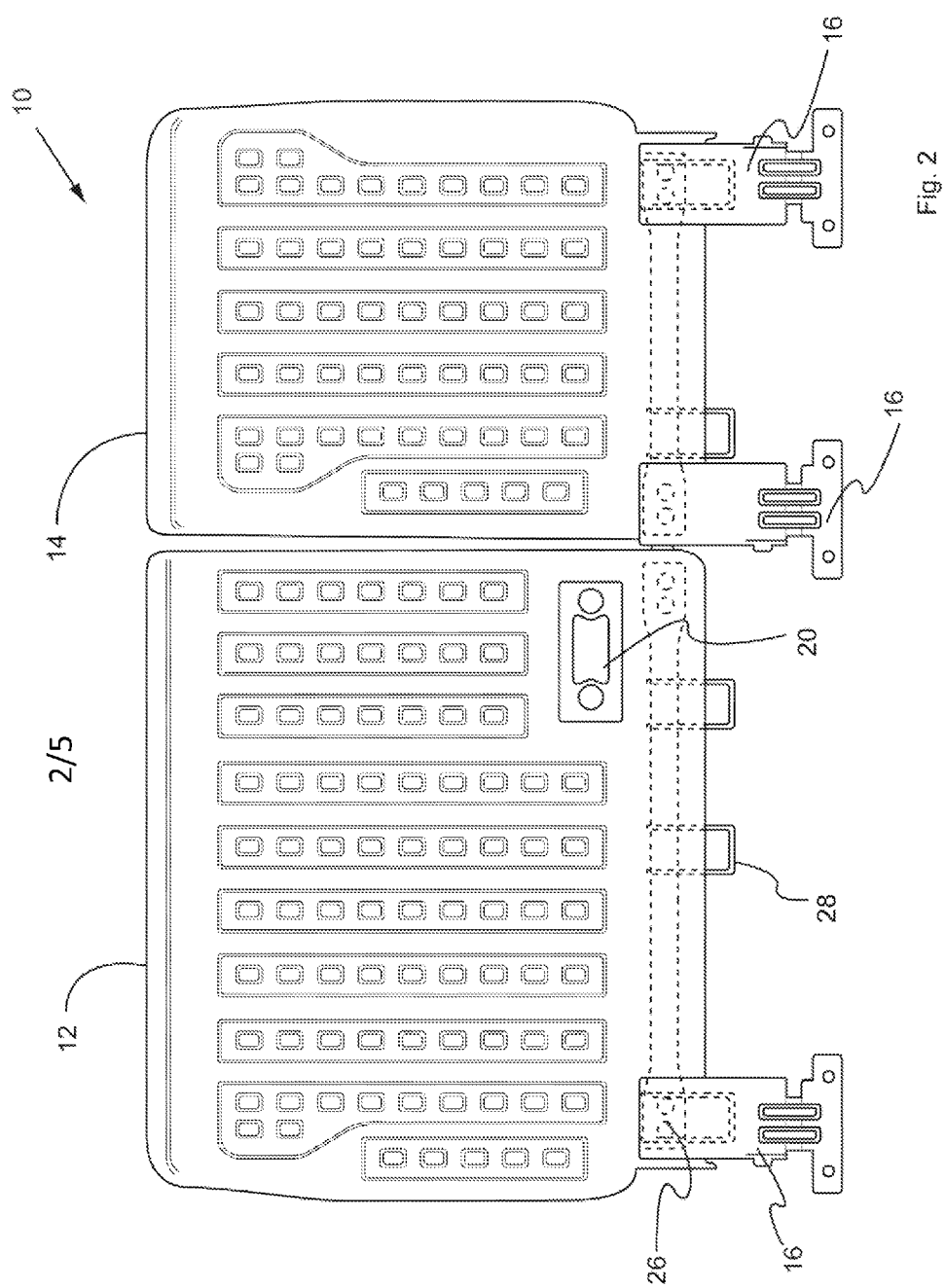
FIG. 2 is a rear view of the seat-back assembly according to the embodiment of FIG. 1.

Turning now to FIGS. 1 and 2, shown are front and rear views, respectively, of a seat-back assembly 10. Seat-back assembly 10 is comprised of first panel 12, and second panel 14, where first and second panels 12, 14 are arranged in a 60/40 split-seat configuration. Each of first and second panels 12, 14 are blow molded articles, having a generally hollow configuration, and may additionally comprise molded features 13, e.g. structural ribs, pillars, etc., to provide increased strength.

Seat-back assembly 10 is mounted to an automotive floor using a plurality of floor-mount brackets 16. To permit seat-back assembly 10 to pivot forward, for example in a fold-down position, or at least to permit access to the vehicle space behind seat-back assembly 10, floor-mount brackets are provided as pivoting brackets. In general, the use of pivoting brackets permits seat-back assembly 10, and in particular first and second panels 12, 14 to pivot from a first position, for example the upright in-use position, to a second position, for example a forwardly or rearwardly folded position. In the arrangement detailed in FIGS. 1 and 2, three floor-mount brackets 16 are used, with one provided on first panel 12, and two provided on second panel 14. Between first and second panels 12, 14, a pivoting bracket 18 is also provided. It will be appreciated that in some embodiments, seat-back assembly 10, or one panel thereof is provided in a non-folding configuration, where the floor mount brackets are of a non-pivoting variety.

Seat-back assembly 10 may also comprise other structural/operational features generally associated with seat-backs. For example, in the embodiment shown, seat-back assembly 10 also provides a hinge bracket 20 for cooperation with a central arm-rest structure or rear-access panel assembly.

Figure 3:
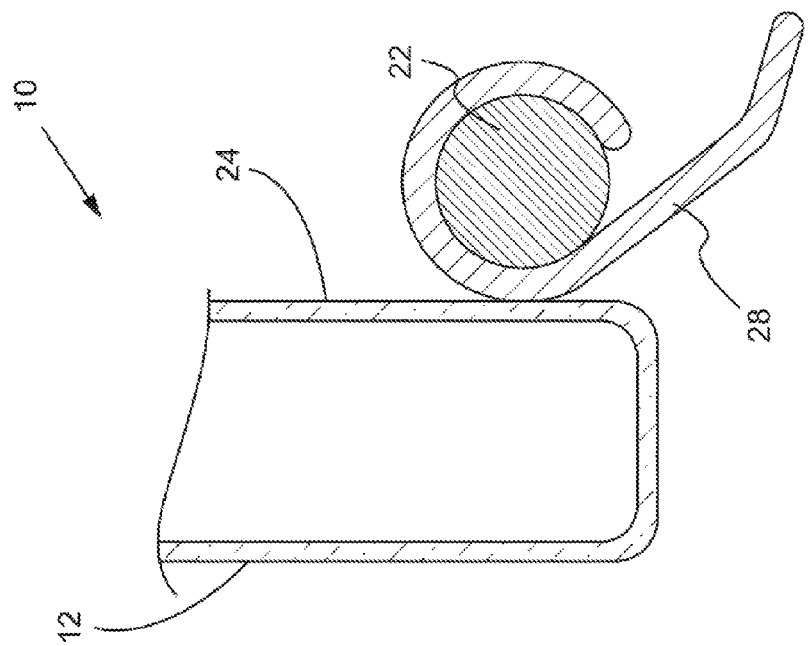
FIG. 3 is a partial sectional view through A-A of FIG. 1, showing an anchorage bar mounted on a front surface of a seat panel.

As detailed in the front view of FIG. 1, first panel 12 and second panel 14 are each provided with an anchorage bar 22. Anchorage bar 22 is generally a metal or structural composite member. Anchorage bar 22 is securely fastened to the front surface 24 of respective first and second panels 12, 14 as shown, using suitable fasteners 26. While exemplified as being fixed to the seat-back assembly 10 solely at each end, anchorage bar 22 may be provided with intermediate attachment points. In the embodiment presented in FIG. 1, anchorage bar 22 provides a rigid mounting structure for ISOFIX-compliant anchorage fixtures, such as child seat anchorage loops 28. Anchorage loops 28 generally extend downward and forwardly as shown in the section view (at A-A) of FIG. 3, to provide access at the juncture of the seatback and seat cushion during installation of a child car seat. While first panel 12 is shown in FIG. 1 to present three anchorage loops 28, and second panel 14 with two anchorage loops 28, any number of anchorage loops 28 may be provided.

Figure 4:
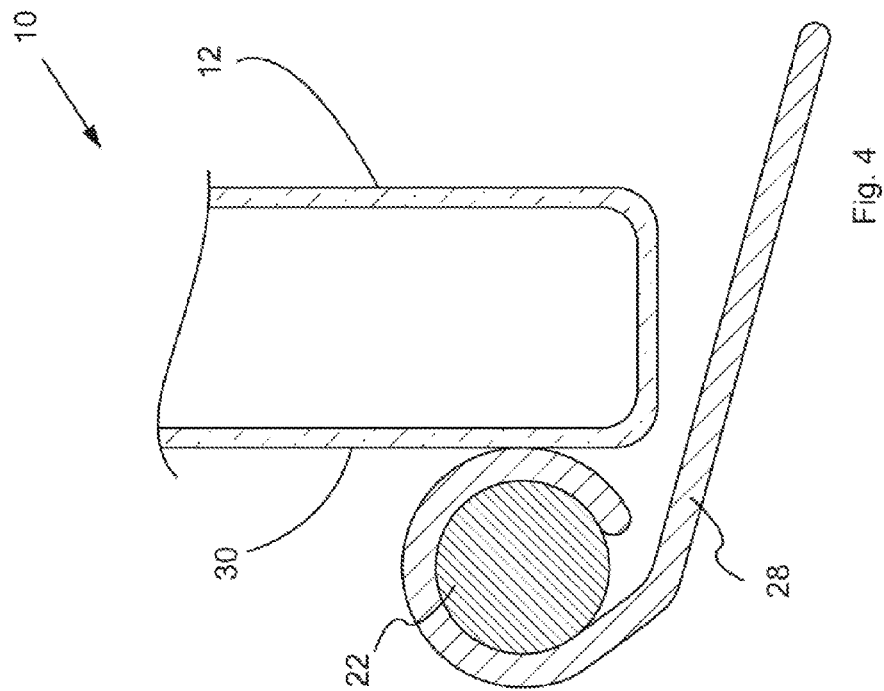
FIG. 4 is a partial sectional view showing an alternate anchorage bar mounting arrangement with the anchorage bar positioned on a rear surface of a seat panel.

While presented on the front surface 24 of each of first and second panels 12, 14, in some embodiments, anchorage bar 22 may be mounted on the rear surface 30, for example as shown in the partial sectional view of FIG. 4. Mounting of anchorage bar 22 on rear surface 30 can be achieved in a similar manner as that described above with respect to front surface mounting. As shown, anchorage loops 28 are configured to extend sufficiently downward and forwardly to permit access at the juncture of the seatback and seat cushion during installation of a child car seat.

In some embodiments, the anchorage bar may be provided as an internal anchorage bar 122 located within the internal structure of a seat-back assembly 110. Turning now to FIG. 5, shown is seat-back assembly 110 comprising internal anchorage bar 122. Similar to the previous embodiment detailed in FIGS. 1 and 2, seat-back assembly 110 comprises a first panel 112, and a second panel 114, where first and second panels 112, 114 are arranged in a 60/40 split-seat configuration. Seat-back assembly 110 also provides a similar configuration of floor-mount brackets 116, with one provided on first panel 112, and two provided on second panel 114. Between first and second panels 112, 114, a pivoting bracket 118 is provided.

Figure 6B:
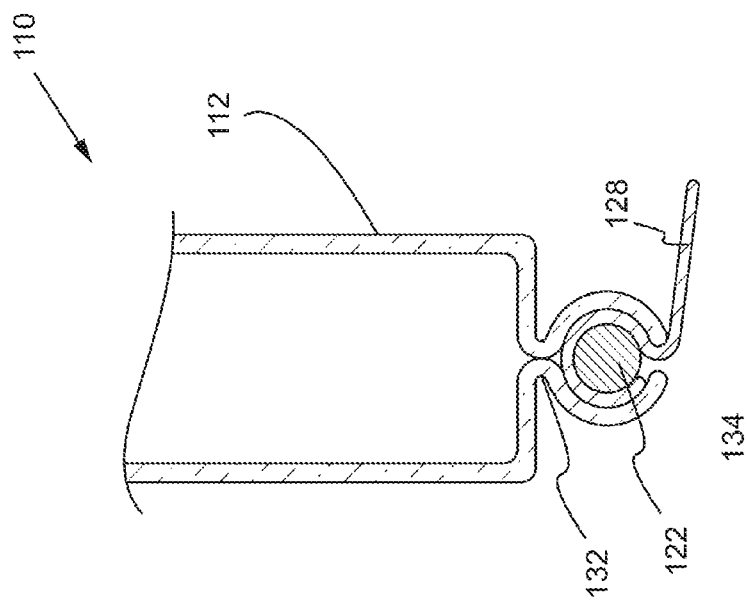
FIG. 6b is a partial sectional view of the embodiment of FIG. 5, showing an anchorage bar located internally of the seat panel structure at B-B.
Figure 6A:
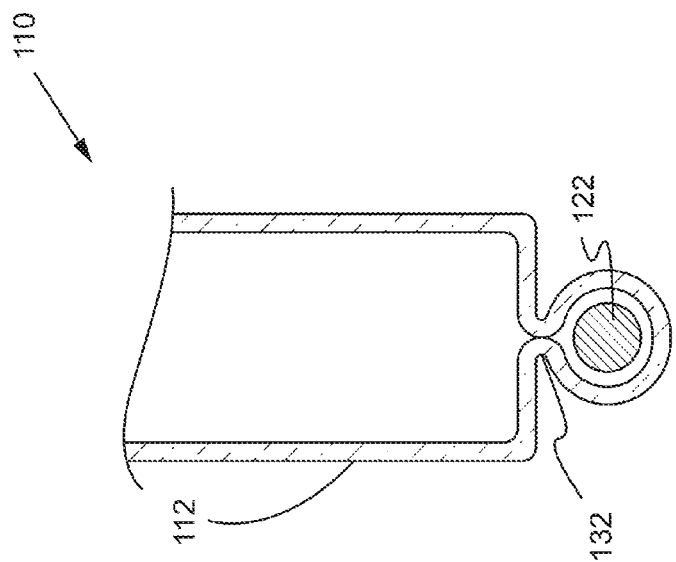
FIG. 6a is a partial sectional view of the embodiment of FIG. 5, showing an anchorage bar located internally of the seat panel structure at C-C.

In this arrangement, anchorage bar 122 is located within the hollow structure of one or both first and second panels 112, 114. As shown in the section view of FIG. 6a, anchorage bar 122 is positioned in the bottom region of the panel, and is retained/locked in position by forming the panel around anchorage bar 122, for example through the use of formed protrusions 132. Alternatively, anchorage bar 122 may be locked in position through the use of suitable fasteners 126, as seen more clearly in FIG. 5. Maintaining anchorage bar 122 in position may also comprise a combination of protrusions and fasteners, as deemed suitable for a particular application.

Anchorage bar 122 provides a rigid mounting structure for anchorage fixtures, such as ISOFIX-compliant child seat anchorage loops 128. Anchorage loops 128 extend through openings 134 provided in the panel 112, and generally extend downward/forwardly as shown in the section view of FIG. 6b, thereby providing access at the juncture of the seatback and seat cushion during installation of a child car seat. As will be appreciated, anchorage bar 122 may be provided with any number of anchorage loops 128, as deemed necessary.

In the embodiments detailed above, the first and second panels may be formed by way of blow molding, using thermoplastic materials including, but not limited to polypropylene, polyethylene, ABS/PC, suitable engineering resins, and blends thereof. The thermoplastic materials may additional comprise mineral fillers. The panels in general will comprise a shape that confers the desired structural properties to meet loading and impact requirements. For example, the panels may include a variety of formed structural elements, such as reinforcement ribs or pillars. Where the anchorage bar is provided as an internal component in the seat panel, one manufacturing option is to insert mold the anchorage bar during blow molding of the seat panel. Another manufacturing option would be to mold the panel with the hollow shape of the anchorage bar, and insert the bar after molding. Still further manufacturing options include forming the panels through other molding processes, including but not limited to thermoforming, injection molding and compression molding.

A variety of anchorage fixtures may be configured to attach to the anchorage bar. In the examples provided, the anchorage fixture is a child seat anchorage loop. The anchorage fixtures may be configured to conform to international standards governing safety devices. In the case of child seat anchorage loops, they may be provided as ISOFIX anchors, as defined by the International Organisation for Standardisation.

The incorporation of the anchorage bar into the seat-back assembly structure has many advantages. For example, incorporating the anchorage bar into the seat back panels, whether internal or external, adds structural stiffness to the panels, reducing deflection upon loading. The construction detailed herein serves to address government requirements in seat back panel deflection, such as ECE14, ECE17, as well as vehicle manufacture due care requirements. The anchorage bar further serves to reduce the number of components and simplify construction, as stiffening members generally provided in traditional seat back panels are replaced by the anchorage bar. With the move towards light-weight materials, the incorporation of the anchorage bar provides the necessary stiffness required to meet seatback loading requirements.

While the invention has been illustrated having regard to a 60/40 split-seat configuration, it will be appreciated that the technology may be applied to other seat assemblies, including, but not limited to 50/50 split-seat arrangements, 100% bench Seats, ⅓-⅔ split-seats, and non-folding rear seat back assemblies. A pass-through access may or may not be provided with any of the aforementioned seat arrangements.

While various embodiments according to the present invention have been described above, it should be understood that they have been presented by way of illustration and example only, and not limitation. It will be apparent to persons skilled in the relevant art that various changes in form and detail can be made therein without departing from the scope of the invention. Thus, the breadth and scope of the present invention should not be limited by any of the above-described exemplary embodiments, but should be defined only in accordance with the appended claims and their equivalents. It will also be understood that each feature of each embodiment discussed herein, and of each reference cited herein, can be used in combination with the features of any other combination. All patents and publications discussed herein are incorporated by reference herein in their entirety.

What is claimed is:

1. An automotive seat-back assembly for an automotive seat, comprising,
   a seat-back panel;
   a plurality of floor-mount brackets mounted on a rear surface of said seat-back panel, said floor-mount brackets for attaching said seat-back panel to an automotive floor;
   an anchorage bar securely fastened to a front surface of said seat-back panel, said anchorage bar being separated from said floor-mount brackets by said seat-back panel; and
   at least one anchorage fixture mounted on said anchorage bar, said anchorage fixture generally extending downward and forwardly for being accessible at a juncture of a seat-back and a seat cushion of the automotive seat.

2. The automotive seat-back assembly according to claim 1, wherein said floor-mount brackets are provided as pivoting brackets allowing said seat-back panel to pivot from a first position to a second position.

3. The automotive seat-back assembly according to claim 1, wherein said seat-back panel is provided in split-form having a first panel and a second panel, each of said first and second panels having associated therewith a respective anchorage bar.

4. The automotive seat-back assembly according to claim 1, wherein said at least one anchorage fixture is provided in the form of an anchorage loop.

5. The automotive seat-back assembly according to claim 1, wherein said seat-back panel is blow molded.

6. The automotive seat-back assembly according to claim 1, wherein said seat-back panel is formed of a thermoplastic material, selected from the group consisting of polypropylene, acrylonitrile butadiene styrene/polycarbonate (ABS/PC), and suitable engineered resins.

7. The automotive seat-back assembly according to claim 1, wherein said seat-back panel is provided with additional molded structural features, including ribs or pillars.

8. The automotive seat-back assembly according to claim 3, wherein said first and second panels are arranged in a 60/40 split-seat configuration.

9. The automotive seat-back assembly according to claim 8, wherein the first panel includes three anchorage fixtures on its respective anchorage bar, and the second panel includes two anchorage fixtures on its respective anchorage bar.

10. The automotive seat-back assembly according to claim 1, wherein said anchorage bar is metal or a structural composite member.

11. The automotive seat-back assembly according to claim 1, wherein said anchorage bar is fastened at each end to said seat-back panel.

12. The automotive seat-back assembly according to claim 4, wherein said anchorage loop extends downward and forwardly of said anchorage bar.

* * * * *